US008801355B2

(12) United States Patent
Price

(10) Patent No.: US 8,801,355 B2
(45) Date of Patent: Aug. 12, 2014

(54) GRABBER ACCESSORY FOR PRIME MOVER

(76) Inventor: Edward B. Price, Midland, VA (US)

( * ) Notice: Subject to any disclaimer, the term of this patent is extended or adjusted under 35 U.S.C. 154(b) by 120 days.

(21) Appl. No.: 13/480,228

(22) Filed: May 24, 2012

(65) Prior Publication Data

US 2012/0308340 A1    Dec. 6, 2012

Related U.S. Application Data

(60) Provisional application No. 61/491,839, filed on May 31, 2011.

(51) Int. Cl.
*A01D 87/12* (2006.01)
*A01D 89/00* (2006.01)
*A01F 25/20* (2006.01)
*A01D 87/00* (2006.01)
*B66F 9/18* (2006.01)

(52) U.S. Cl.
CPC ............ *A01D 87/127* (2013.01); *A01D 87/126* (2013.01); *B66F 9/18* (2013.01); *Y10S 414/125* (2013.01); *Y10S 414/12* (2013.01)
USPC ............ 414/723; 414/912; 414/907; 414/704

(58) Field of Classification Search
USPC ............... 212/292; 294/105, 61; 37/405, 406, 37/903; 414/111, 24.5, 24.6, 622, 703, 414/704, 721, 722, 723, 724, 740, 907, 911, 414/912, 920
See application file for complete search history.

(56) References Cited

U.S. PATENT DOCUMENTS

| | | | | |
|---|---|---|---|---|
| 2,719,641 A | * | 10/1955 | Pilch | 414/704 |
| 2,743,028 A | * | 4/1956 | Reich | 414/663 |
| 2,903,803 A | * | 9/1959 | Austin, Sr. | 414/740 |
| 3,700,131 A | * | 10/1972 | Westendorf | 414/704 |
| 3,897,880 A | * | 8/1975 | Waske et al. | 414/24.5 |
| 3,934,726 A | | 1/1976 | Martin | |
| 4,106,645 A | * | 8/1978 | Janish | 414/723 |
| 4,264,252 A | | 4/1981 | Jennings et al. | |
| 4,364,700 A | * | 12/1982 | Arabshian et al. | 414/24.5 |
| 4,411,573 A | | 10/1983 | Townsend | |
| 4,548,535 A | | 10/1985 | van Die | |
| 4,911,491 A | | 3/1990 | Naaktgeboren | |

(Continued)

FOREIGN PATENT DOCUMENTS

| | | | | | |
|---|---|---|---|---|---|
| EP | 33866 | A2 | * | 8/1981 | A01D 87/08 |
| EP | 55186 | A1 | * | 6/1982 | A01D 87/08 |
| FR | 2828877 | A1 | * | 2/2003 | B66F 9/18 |
| GB | 2462510 | A | * | 2/2010 | A01D 87/12 |

*Primary Examiner* — Gregory Adams
(74) *Attorney, Agent, or Firm* — Matthew J. Lattig; Charter IP, LLC

(57) ABSTRACT

A grabber accessory for attachment to a prime mover is described, and may include a stanchion, pivotable arm having a proximate end attached to the stanchion to form a pivot point of the arm and a distal end extending generally transverse to the stanchion and terminating in at least one downward tine, and hydraulic cylinder attached between an upper end of the stanchion and a surface of the arm between the proximate and distal ends. The hydraulic cylinder may be configured to raise and lower the arm under hydraulic control from a main hydraulic feed of the prime mover. The accessory further includes a pair of vertically spaced clamping assemblies attaching a lower portion of the stanchion to frame member surfaces of the prime mover so as to secure the accessory in an upright position.

17 Claims, 14 Drawing Sheets

(56) References Cited

U.S. PATENT DOCUMENTS

| | | | |
|---|---|---|---|
| 5,094,581 A | 3/1992 | Lamb | |
| 6,109,859 A * | 8/2000 | Domann | 414/729 |
| 6,139,235 A * | 10/2000 | Vander Koy et al. | 410/111 |
| 7,354,239 B2 * | 4/2008 | Deyo et al. | 414/724 |
| 2002/0192065 A1 * | 12/2002 | Underwood | 414/729 |
| 2006/0120842 A1 * | 6/2006 | Thompson | 414/462 |
| 2011/0002757 A1 | 1/2011 | Taylor | |

* cited by examiner

To 110

GRABBER ACCESSORY FOR PRIME MOVER

CROSS-REFERENCE TO RELATED APPLICATION

The present application claims the benefit under 35 U.S.C. §119(e) of U.S. Provisional Patent Application No. 61/491,839 to the inventor, filed May 31, 2011, the entire contents of which is hereby incorporated by reference herein.

BACKGROUND

1. Field

Example embodiments in general relate to a grabber accessory, and in a particular example to a grabber accessory configurable for use with an existing hay bale spear mounted on a prime mover such as a farm tractor.

2. Related Art

Traditionally, bale spears are employed for lifting, moving and repositioning five and six foot round hay bales around a farm complex. On cattle and horse farms, these round hay bales are typically placed in feed rings located about the farm to feed farm animals throughout the year. The conventional bale spear, while adept in holding the round hale bale for transport, is not typically adequate at repositioning the round hale bale over the feed ring for release within the feed ring. Often, the bale slips off the spear and damages or crushes part of the feed ring, potentially costing the owner time and money.

SUMMARY

An example embodiment is directed to a grabber accessory configurable for attachment to a bale spear implement. The accessory includes a single, vertically-oriented stanchion, a pivotable arm having a proximate end attached to the stanchion to form a pivot point of the arm and a distal end extending generally transverse to the stanchion and terminating in a downward central claw, and a pair of downward extending tines, each tine mounted to the distal end of the arm in opposed spaced relation to the claw on either side thereof. The accessory further includes a hydraulic cylinder attached between an upper end of the stanchion and a surface of the arm between the proximate and distal ends, where the hydraulic cylinder is configured to raise and lower the arm under hydraulic control from a main hydraulic feed of a prime mover to which the bale spear implement is attached; a hollow tubular sleeve securing a lower portion of the stanchion therein, and a pair of vertically spaced clamping assemblies coupling the sleeve to cross member surfaces of the bale spear implement so as to secure the grabber accessory in an upright position adjacent a main spear of the bale spear implement extending outward therefrom in perpendicular relation to the stanchion.

Another example embodiment is directed to a grabber accessory having a single, vertically-oriented stanchion and a pivotable arm having a proximal end connected pivotally connected to the stanchion and a distal end including one or more downward extending tines. The accessory further includes a hydraulic cylinder attached between the stanchion and arm to raise and lower the arm under hydraulic control from a main hydraulic feed of a tractor to which the bale spear implement is attached, and a pair of vertically spaced clamping assemblies coupling a lower portion of the stanchion to the bale spear implement in an upright position.

Another example embodiment is directed to a grabber accessory for attachment to a prime mover. The accessory includes a stanchion, a pivotable arm having a proximate end attached to the stanchion to form a pivot point of the arm and a distal end extending generally transverse to the stanchion and terminating in at least one downward tine, a hydraulic cylinder attached between an upper end of the stanchion and a surface of the arm between the proximate and distal ends, the hydraulic cylinder configured to raise and lower the arm under hydraulic control from a main hydraulic feed of the prime mover, and a pair of vertically spaced clamping assemblies attaching a lower portion of the stanchion to frame member surfaces of the prime mover so as to secure the grabber accessory in an upright position.

BRIEF DESCRIPTION OF THE DRAWINGS

Example embodiments will become more fully understood from the detailed description given herein below and the accompanying drawing, wherein like elements are represented by like reference numerals, which are given by way of illustration only and thus are not limitative of the example embodiments herein.

DETAILED DESCRIPTION

Figure 1:
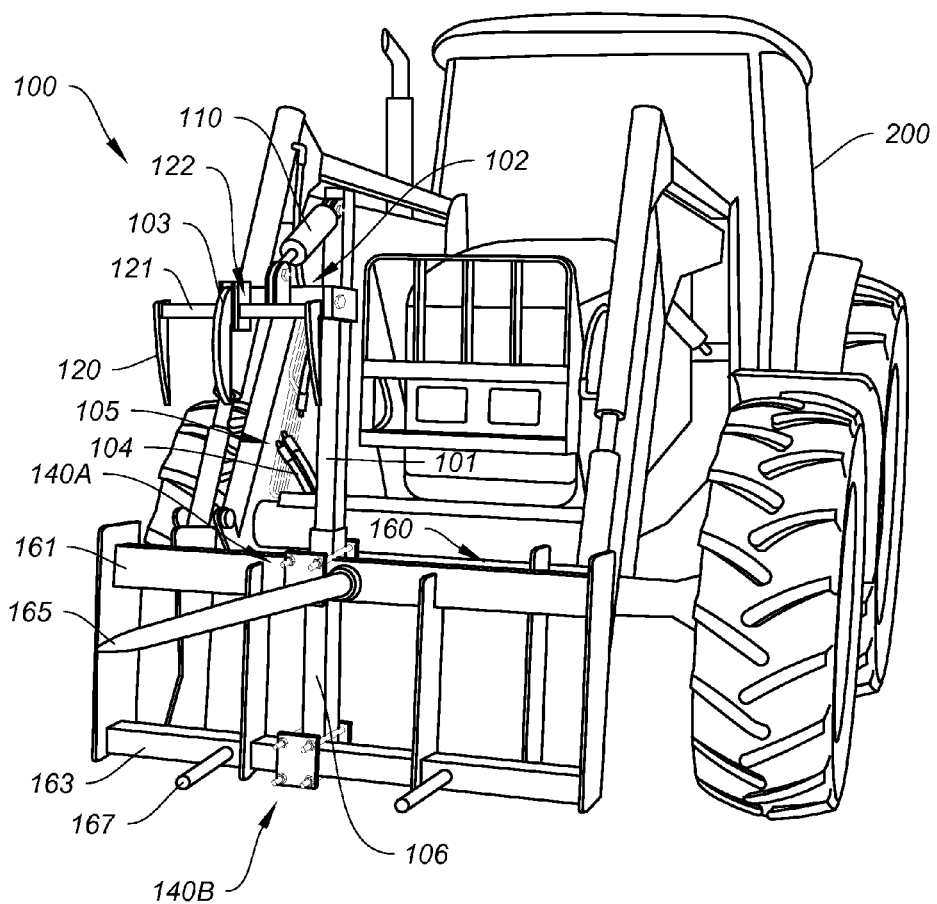
FIG. 1 is a perspective view of a grabber accessory mounted to a bale spear on a farm tractor according to an example embodiment.
Figure 2:
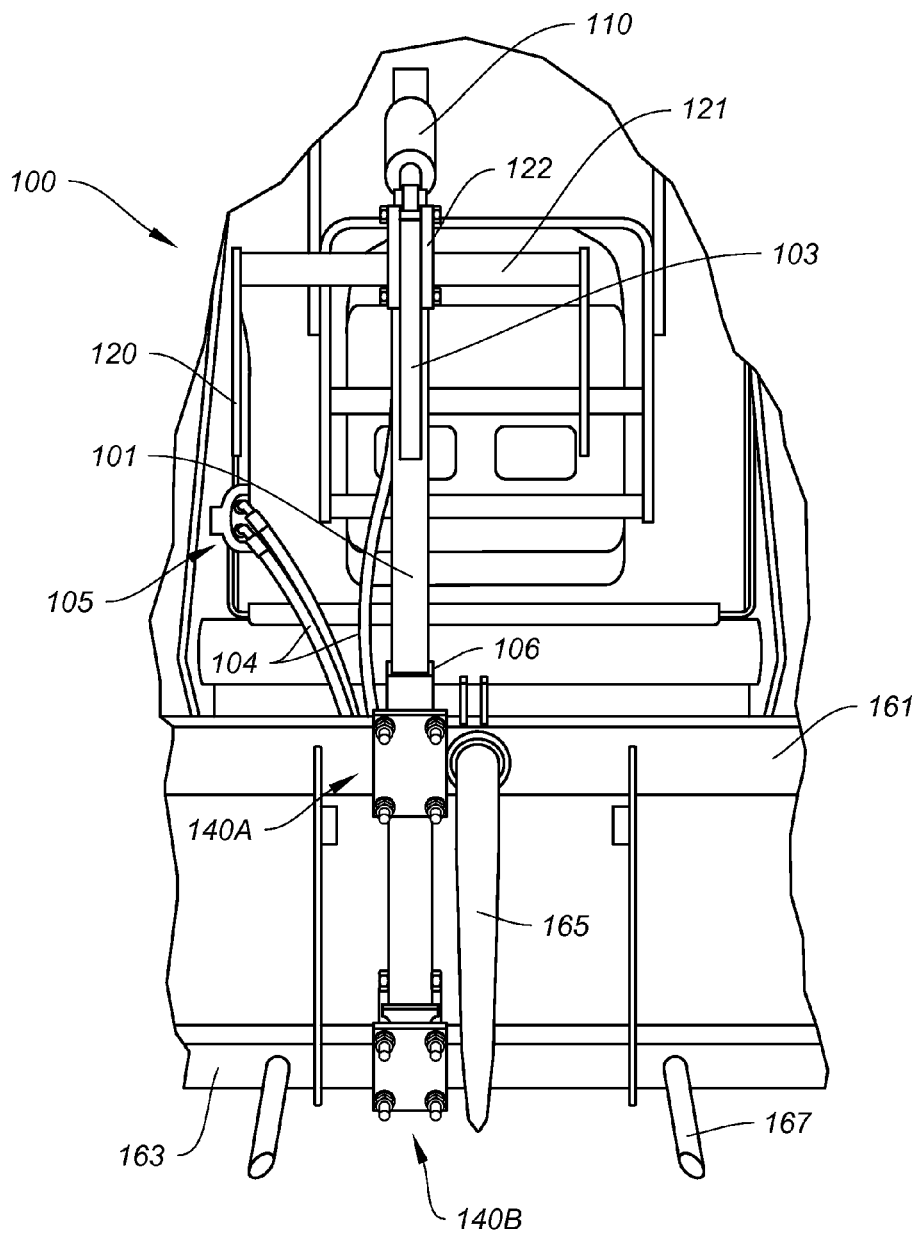
FIG. 2 is an enlarged front view of the grabber accessory shown in FIG. 1.

FIG. 1 is a perspective view of a grabber accessory mounted to a bale spear on a farm tractor according to an example embodiment; FIG. 2 is an enlarged front view of the grabber accessory shown in FIG. 1. Referring to FIGS. 1 and 2, there is shown a prime mover, in this example a farm tractor 200, on which is mounted a bale spear implement 160. Conventionally, the bale spear implement includes a main spear 165 and secondary minor spears 167 to penetrate and move hay bales.

However, next to the main spear 165, a grabber accessory 100 is mounted on the bale spear implement 160. Specifically, a pair of vertically spaced clamping assemblies 140A and 140B attach a lower portion of a stanchion 101 of the accessory 100 to frame member surfaces 161 and 163 of the prime mover (i.e., tractor 200) so as to secure the grabber accessory 100 in an upright position.

Accessory 100 includes a single, main vertically-oriented stanchion 101. In an example, stanchion 101 may be fabricated from stainless steel. An arm 102 is pivotally connected thereto. The arm 102 may be made of steel and terminates at a distal end in a grabber or curved claw 103. This curved claw 103 will act with a main manipulating finger of the accessory 100 to help position and hold a hay bale over a final destination such as a feed ring for example, and prevent the bale from slipping off the main spear rod 165.

The arm 102 has a proximate end connected to the stanchion 101, and includes a pair of downward extending tines 120 at its distal end offset from the center claw 103. As shown, each tine 120 is mounted to a horizontal connector rod 121 which in turn is attached to a corresponding plate 122, the plates 122 sandwiching the arm 102/claw 103. Thus, the distal or terminating ends of the claw 103 and tines 120 (offset and/or slightly back from claw 103) are adapted to penetrate one of a round bale and a square hay bale.

A hydraulic cylinder 110 is attached between the stanchion 101 and arm 102. The hydraulic cylinder 110 is configured to raise and lower the arm 102 under hydraulic control from a main hydraulic feed 105 of the prime mover. Specifically, supply hoses 104 carry hydraulic fluid between a source header at main feed 105 to hydraulic cylinder 110, so as to actuate movement (up/down, articulation, etc.) of the stanchion 101 and arm 102 at multiple pivot points. Details of this will be seen in further detail below.

Accessory 100 optionally includes a hollow tubular sleeve 106 securing a lower portion of the stanchion 101 therein. Use of the sleeve 106 permits the accessory 100 to be height-adjustable to handle both round hay bales and square hay-bale cubes (such as 4'×4'×4' bundles, or 64 cu ft). Specifically, the sleeve 106 may include bores which align with a through bore in a lower part of stanchion 101, so that the stanchion 101 is height adjustable within the sleeve 106. This shall be seen in more detail hereafter.

Clamping assemblies 140A and 140B are the sole means of securing the grabber accessory 100 to the bale spear implement 160. This simplistic arrangement and fastidious connection scheme lends itself to quick retrofitting to any prime mover that has frame surfaces. This will be shown in further detail below.

Figure 3:
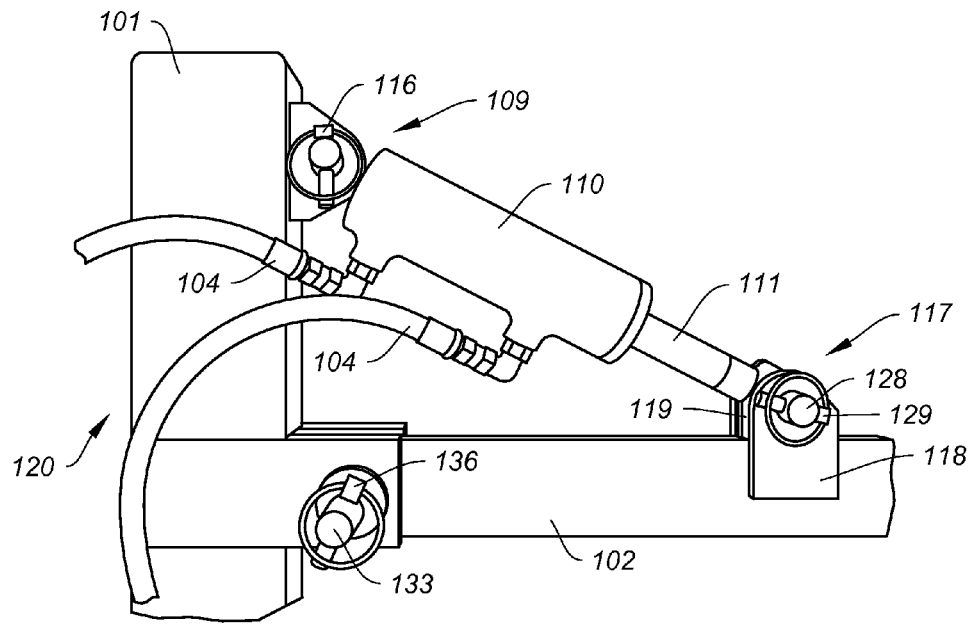
FIG. 3 is an enlarged, partial right side view of an upper portion of the grabber accessory to illustrate a hydraulic cylinder in more detail.
Figure 4:
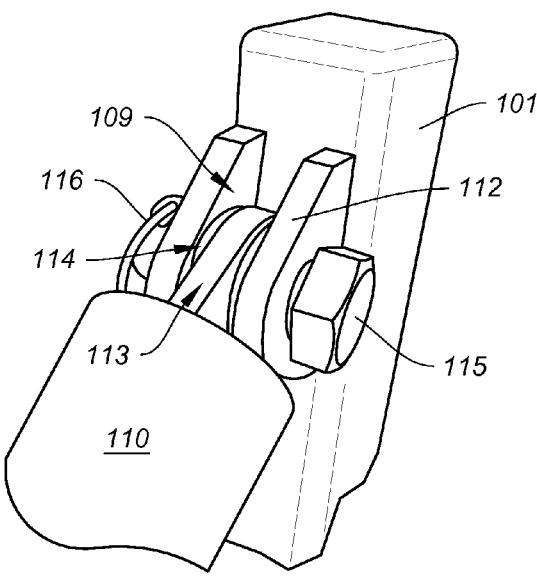
FIG. 4 is an enlarged, partial top perspective view of the top end of the grabber accessory to illustrate selected components thereof in more detail.
Figure 5:
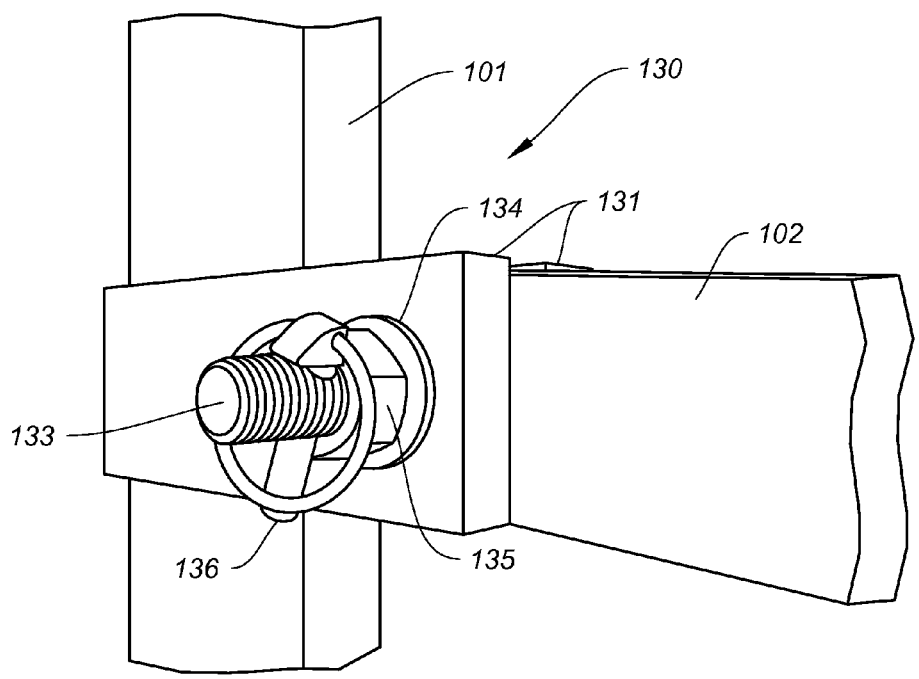
FIG. 5 is an enlarged, partial right side view to illustrate an arm to stanchion connection on the grabber accessory.

FIG. 3 is an enlarged, partial right side view of an upper portion of the grabber accessory to illustrate a hydraulic cylinder in more detail; FIG. 4 is an enlarged, partial top perspective view of the top end of the grabber accessory to illustrate selected components thereof in more detail; and FIG. 5 is an enlarged, partial right side view to illustrate an arm to stanchion connection on the grabber accessory. FIGS. 3-5 help to illustrate the three pivot points between arm, hydraulic cylinder and stanchion in accessory 100.

Referring to FIGS. 3-5, there are shown three points of pivot 109, 117, 130 in triangular relation between the stanchion 101, hydraulic cylinder 110 and arm 102. This connection scheme facilitates manipulation accessory 100 (specifically the orientation of arm 102 and hence claw 103 with tines 120) to grab or penetrate any location of a straight or angled bale, and/or to position, turn and place the held bale as needed.

At pivot point 109, a first end of cylinder 110 terminates in a flange 113 which is connected to an ear 112 of stanchion 101 via fastening means. In an example, fastening means can include washer 114 receiving bolt 115 therethrough and tightened by a lock nut 116 (nut with cotter/lock pin) to secure one end of cylinder 110 to the stanchion 101. Similarly at pivot point 117, the other or second end of cylinder 110 terminates in a flange 119 (on the end of a reciprocating rod 111, which in turn is connected to an internal piston within cylinder 110, as is known). Flange 119 is connected to an ear 118 of arm 102 via fastening means. In an example, fastening means includes a washer (not shown) receiving bolt 128 therethrough and tightened by a lock nut 129 (nut with cotter/lock pin) to secure the other end of cylinder 110 to the arm 102.

As best shown in FIG. 5, third pivot point 130 is formed where the proximate end of arm 102 meets stanchion 101. At pivot point 130, proximate end or arm 102 may be secure between a pair of braces 131, which in turn may be affixed to stanchion 101 by welds (not shown). The proximate end of arm 102 includes a hole through which aligns with bores in brace 131 ends, through which extends fastening means for attaching the pivotable arm 102. The fastening means may include a through bolt 133, washer 134, nut 135 and lock pin 136, as shown in FIG. 5 for example.

Figure 6:
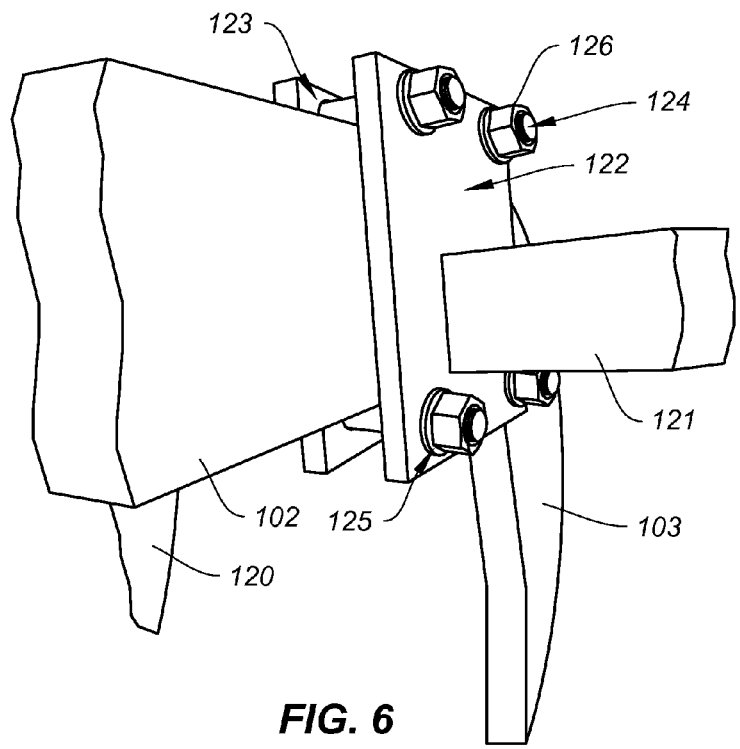
FIG. 6 is an enlarged, partial right side view of the distal end of the arm and to illustrate plate connections of the tines to center claw on the grabber accessory.

FIG. 6 is an enlarged, partial right side view of the distal end of the arm and to illustrate plate connections of the tines to center claw on the grabber accessory. The distal end of arm 102 terminates in claw 103, and also includes a pair of downward extending tines 120 offset from the center claw 103. As shown, each tine 120 is mounted to a horizontal connector rod 121 which in turn is attached to a corresponding plate 122. Each plate may include a plurality of corner apertures configured to receive fastener means therethrough so as to secure the tines 120 to the arm 102.

In this example, the plates 122 sandwich the arm 102/claw 103, as the fastener means comprises bolts 124 (inserted through corner bores 123 in plates 122), washers 125 and nuts 126 which secure the plates 122 (and attached rods 121 with tines) around arm 102. Thus, the distal or terminating ends of the claw 103 and tines 120 (offset and/or slightly back from claw 103) are adapted to penetrate one of a round bale and a square hay bale. Although an arm 102 with retrofitted tines 120 (the left tine 120 of which is fully shown), a single piece arm with integral tines 120 is contemplated for manufacture as well.

Figure 7:
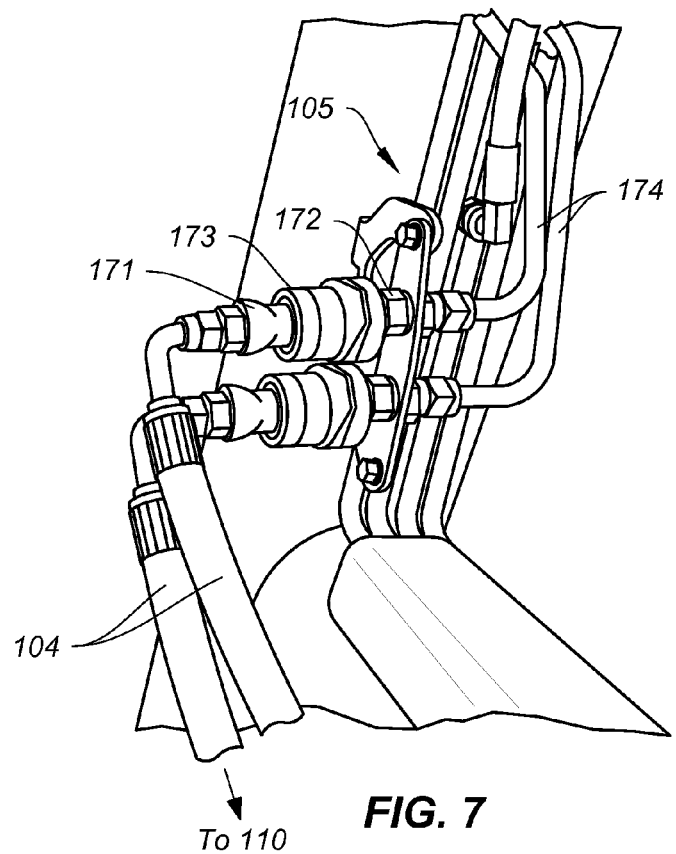
FIG. 7 is a close-up view to illustrate connections between hydraulic hoses of the grabber accessory to the main hydraulic supply system of the tractor for remote operator control thereof.

FIG. 7 is a close-up view to illustrate connections between hydraulic hoses of the grabber accessory to the main hydraulic supply system of the tractor for remote operator control thereof. Here, connectors 173 attached to end caps 171 of the supply hoses 104 to hydraulic cylinder 110 of the grabber accessory are shown attached into the main hydraulic feed 105 of the prime mover 200. Specifically, connectors 173 are attached to corresponding connectors 172 of auxiliary supply lines 174 which tap off the main hydraulic feed 105 header of the tractor (prime mover 200 in this example). In this configuration, the operator now has local control of the hydraulic cylinder 110 so as to be able to actuate the arm 102 as needed to position a hay bale in conjunction with the main spear 165 of bale spear implement 160.

FIGS. 8-13 provide various views to describe the clamping assemblies, sleeve and additional selected components of the grabber accessory in further detail. As shown best in FIG. 8, the supply hoses 104 extend between the hydraulic cylinder 110 and main feed 105 on the prime mover 200. To prevent damage thereto, the hoses 104 may be secured against stanchion 101 via a clamp 175, which may be secured to stanchion 101 via fasteners 176. The upper ends of hoses 104 terminate in connectors 177 which mate with cylinder inlet ports 178. A guide ring 179 may be attached toward the lower end of stanchion 101 to maintain the hoses 104 along the stanchion 101/sleeve 106 body and facilitate guiding the lower ends of hoses up to the connectors 172 of auxiliary supply lines 174 at the main hydraulic feed 105 header of prime mover 200.

Figure 9:
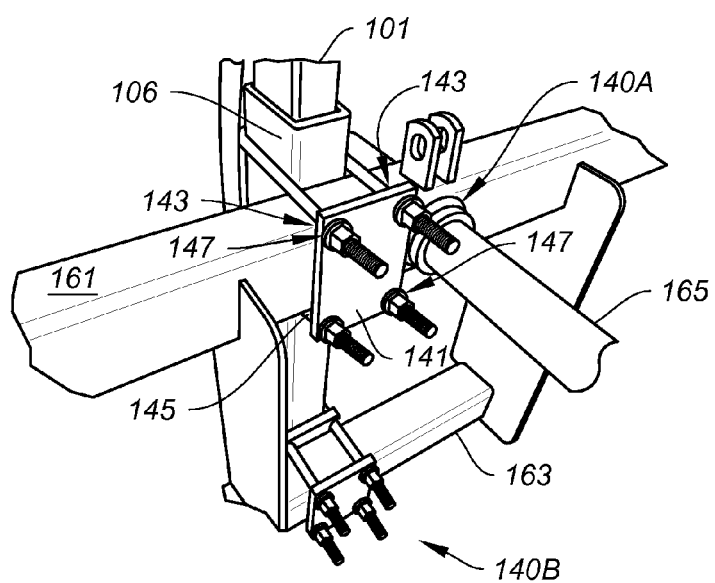
FIG. 9 is a front view of a lower section of the grabber accessory to illustrate a pair of clamping assemblies in more detail.
Figure 8:
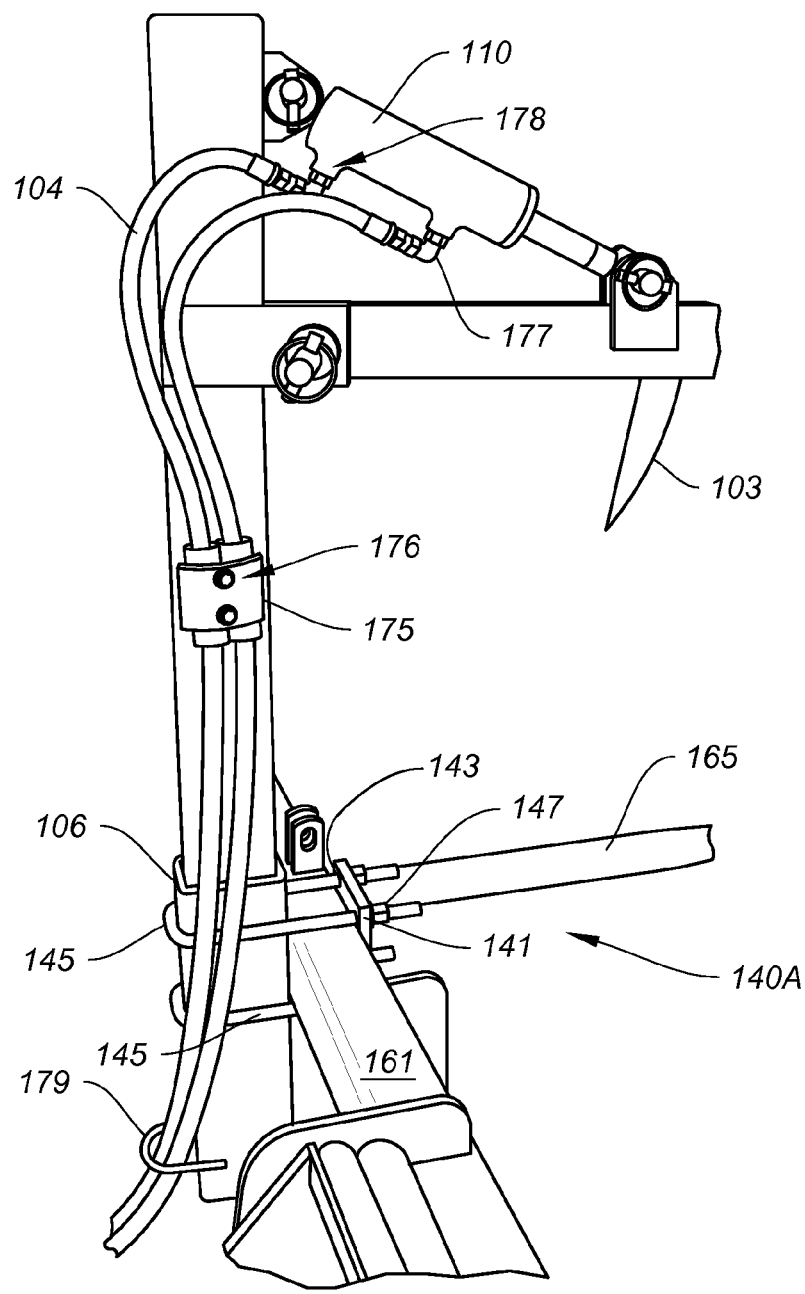
FIG. 8 is a partial right-side view of the grabber accessory to illustrate selected components thereof.
Figure 10:
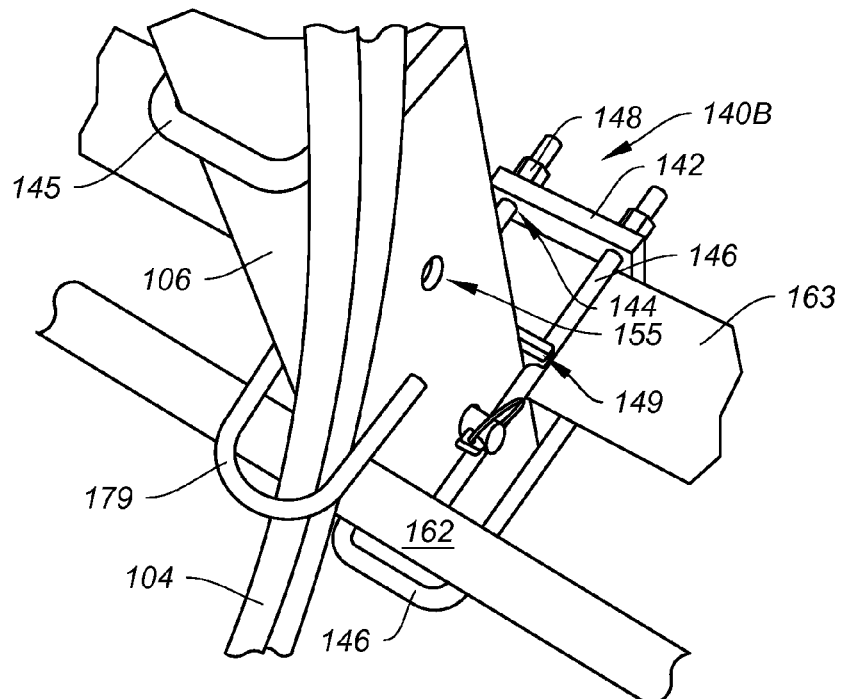
FIG. 10 is a close-up rear view of a lower section of the grabber accessory to illustrate selected features of the clamping assemblies.
Figure 12:
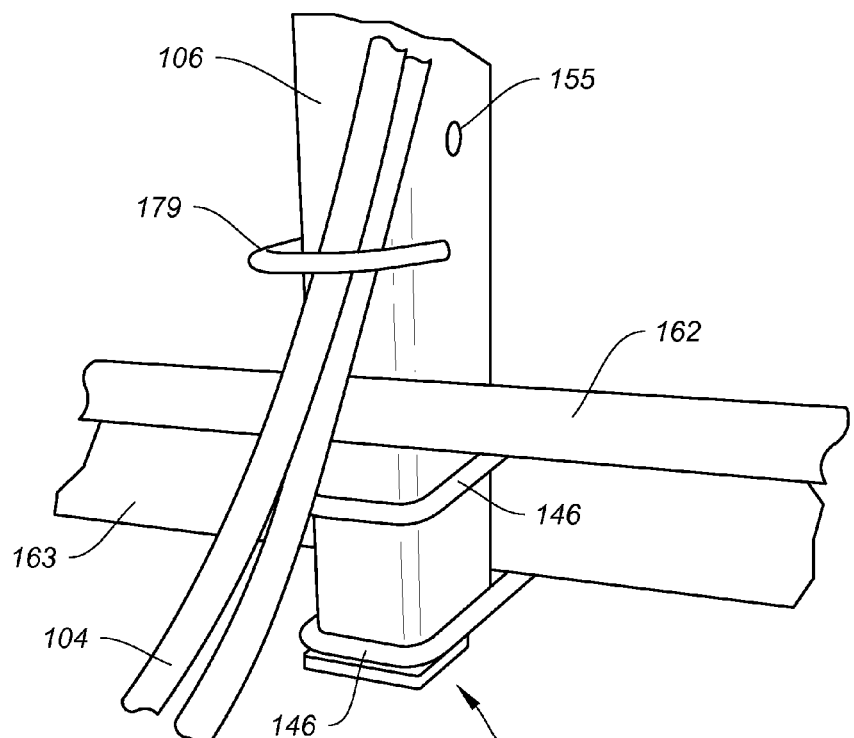
FIG. 12 is an enlarged rear view of the accessory to illustrate the lower section of the sleeve and bottom end of the stanchion in more detail.

As best seen in FIGS. 9, 10 and 12, there are shown clamping assemblies 140A and 140B as the sole means of securing the grabber accessory 100 to the bale spear implement 160. This simplistic arrangement and fastidious connection scheme lends itself to quick retrofitting to any prime mover 200 that has frame surfaces, such as surface 161 and 163 of the bale spear implement 160. There is shown a pair of vertically spaced clamping assemblies 140A (upper) and 140B (lower). These couple or attach the sleeve 106 to cross member surfaces 161, 163 of the bale spear implement 160, thereby securing the grabber accessory 101; as shown in an upright position adjacent the main spear 165.

Clamping assembly 140A (upper) includes an upper plate 141. Plate 141 includes corner holes 143 for receiving a pair of U-bolts 145 therethrough as shown. The plate 141 is adapted to bear against (cross member) frame surface 161 of the prime mover 200/bale spear implement 160. As can be seen, the U-bolts 145 contact an upper portion of the sleeve 106, so as to engage the sleeve 106 (and hence stanchion 101) to the prime mover 200/bale spear implement 160. Each U-bolt 145 a threaded ends which extend through corresponding corner pairs of holes 143 and are secured by fasteners 147 so as to torque the (cross member) frame surface 161 of the prime mover 200/bale spear implement 160 between the sleeve 106 and upper plate 141.

Similarly, clamping assembly 140B (lower) includes a lower plate 142 with corner holes 144 for receiving a pair of U-bolts 146 therethrough, as shown. The plate 142 is adapted to bear against (cross member) frame surface 163 of the prime mover 200/bale spear implement 160. As can be seen, the U-bolts 146 contact a lower portion of the sleeve 106, so as to engage the sleeve 106 (and hence stanchion 101) to the prime mover 200/bale spear implement 160. Each U-bolt 146 a threaded ends which extend through corresponding corner pairs of holes 144 and are secured by fasteners 148 so as to torque the (cross member) frame surface 163 of the prime mover 200/bale spear implement 160 between the sleeve 106 and lower plate 142.

Figure 11:
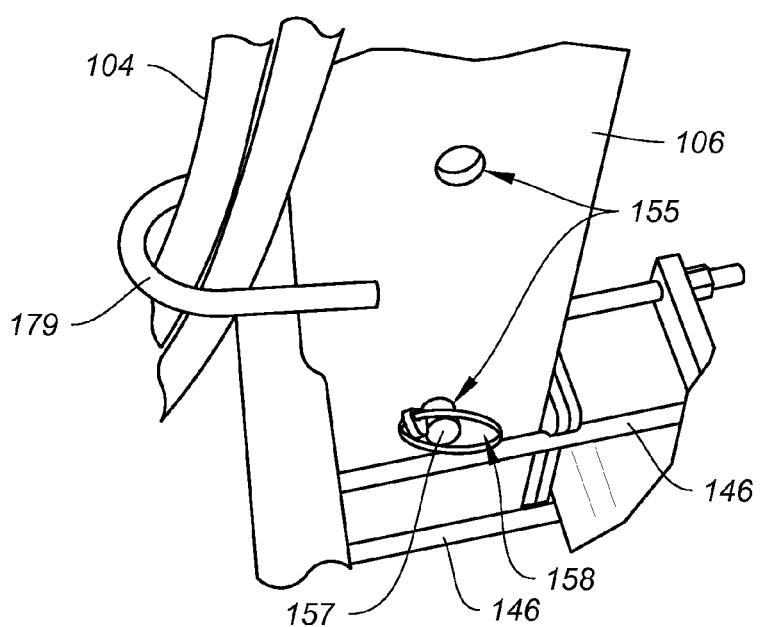
FIG. 11 is a right side partial view of the sleeve to illustrate the height adjustability of the stanchion therein.
Figure 13:
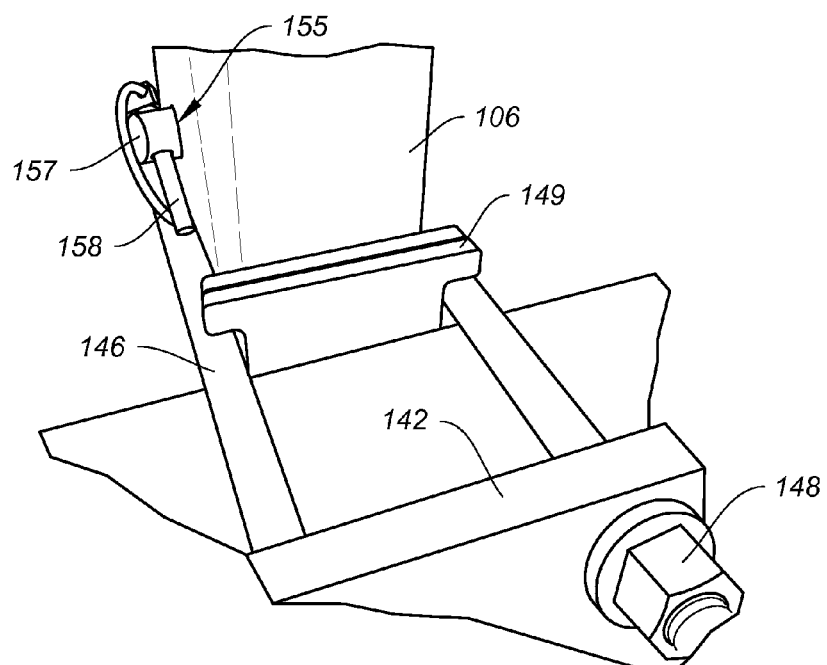
FIG. 13 is a top perspective view of an interface between the lower clamping assembly, sleeve and bale spear to illustrate a plurality of shims in more detail.

Additionally, the operator may employ one or more metal shims 149. As shown in FIGS. 11 and 13, one or more shims 149 made out of steel or an alloy thereof may be inserted behind plates 141 and/or 142 where mating surfaces on a prime mover 200 are uneven, so as to provide an even and/or flush surface for installing an upright grabber assembly 100 on the prime mover 200.

The sleeve 106 is in fact a hollow tubular member; FIG. 12 illustrates the bottom end 151 of the stanchion 101 protruding from the sleeve 106 lower end. Thus, as the stanchion 101 is height adjustable within the sleeve 106, the accessory 100 has a height adjustment feature to accommodate bales of different sizes.

As best shown in FIGS. 11 and 12, the sleeve 106 includes a pair of vertically-spaced alignment bores 155 extending completely therethrough (both sides). One set of these bores 155 (at a time) are configured to align with a single through bore (not shown, obscured by lock pin) formed through a lower portion of the stanchion 101. As shown, the lower alignment bore 155 is aligned, with retaining bolt (or pin) 157 inserted in the aligned holes and secured by lock pin 158 (shown as a cotter pin). This locks the stanchion 101 in at a desired height, i.e., for the arm 102 above the main spear 165.

Figure 14:
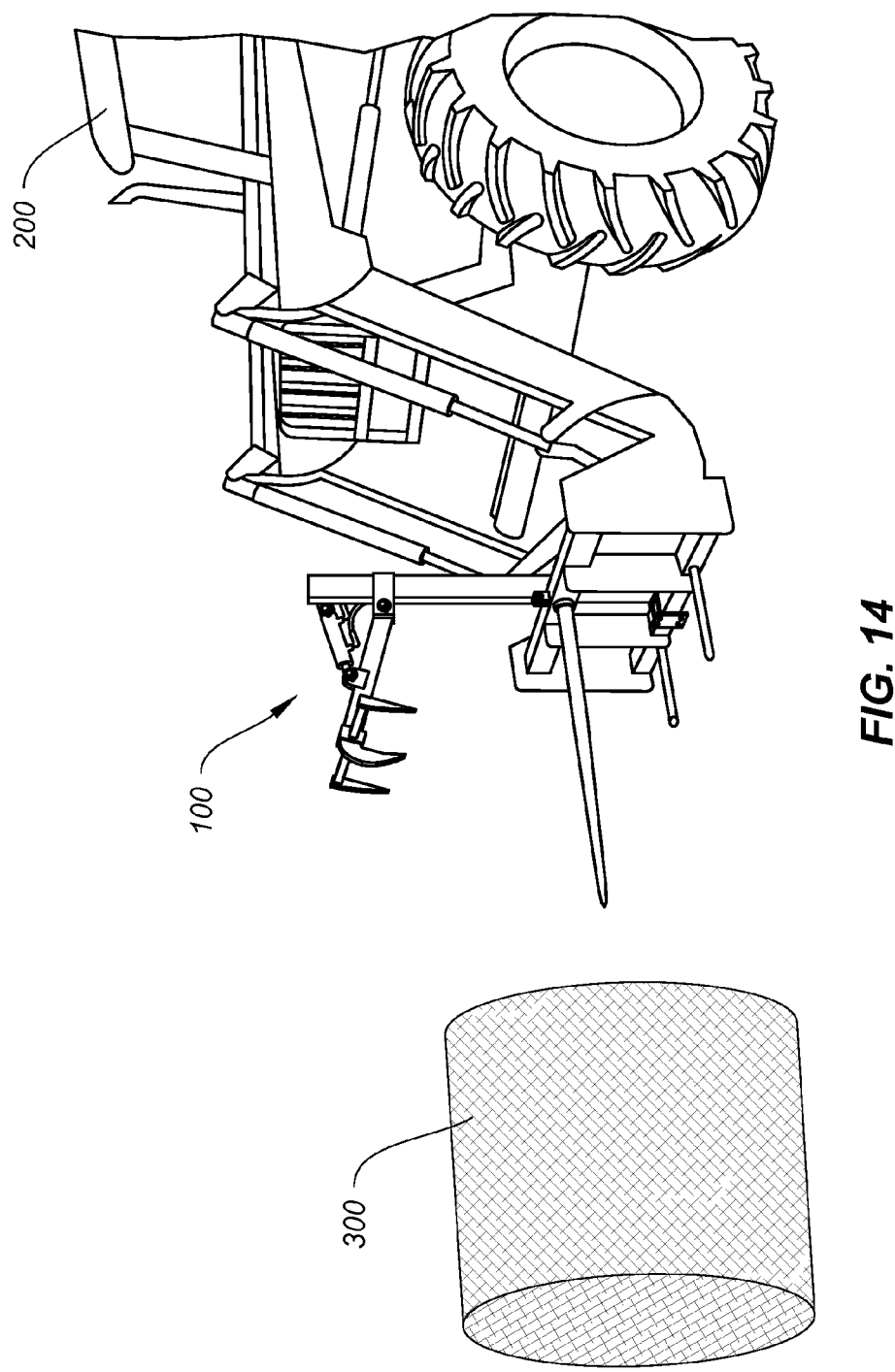
FIG. 14 illustrates a tractor with bale spear implement configured with the bale grabber according to the example embodiment, on approach toward a round hay bale.
Figure 15:
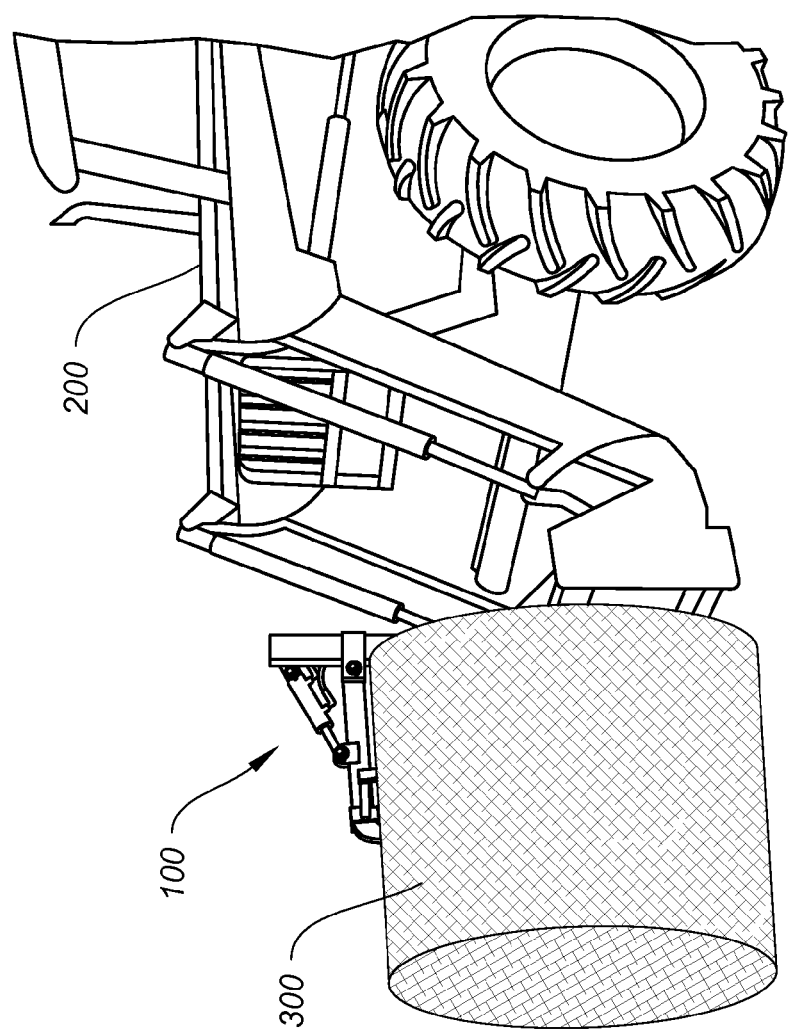
FIG. 15 illustrates engagement of the hay bale by the bale spear with grabber accessory.

FIGS. 14-18 illustrate general operation of engaging a hay bale and positioning it for release over a feed ring using the grabber accessory 100 according to the example embodiments. In FIG. 14, a tractor 200 with bale spear implement 160 having the grabber accessory 100 attached thereto is on approach toward a round hale bale 300. In FIG. 15, bale spear implement 160 with grabber accessory 100 engages the hay bale 300, the claw and tines penetrating the side of the bale 300 under hydraulic power control of the cylinder 110 to provide additional securing of the bale 300 on the main spear. The tractor 200 can then travel with the bale 300 aloft and more secure with this additional points of grapple.

Figure 16:
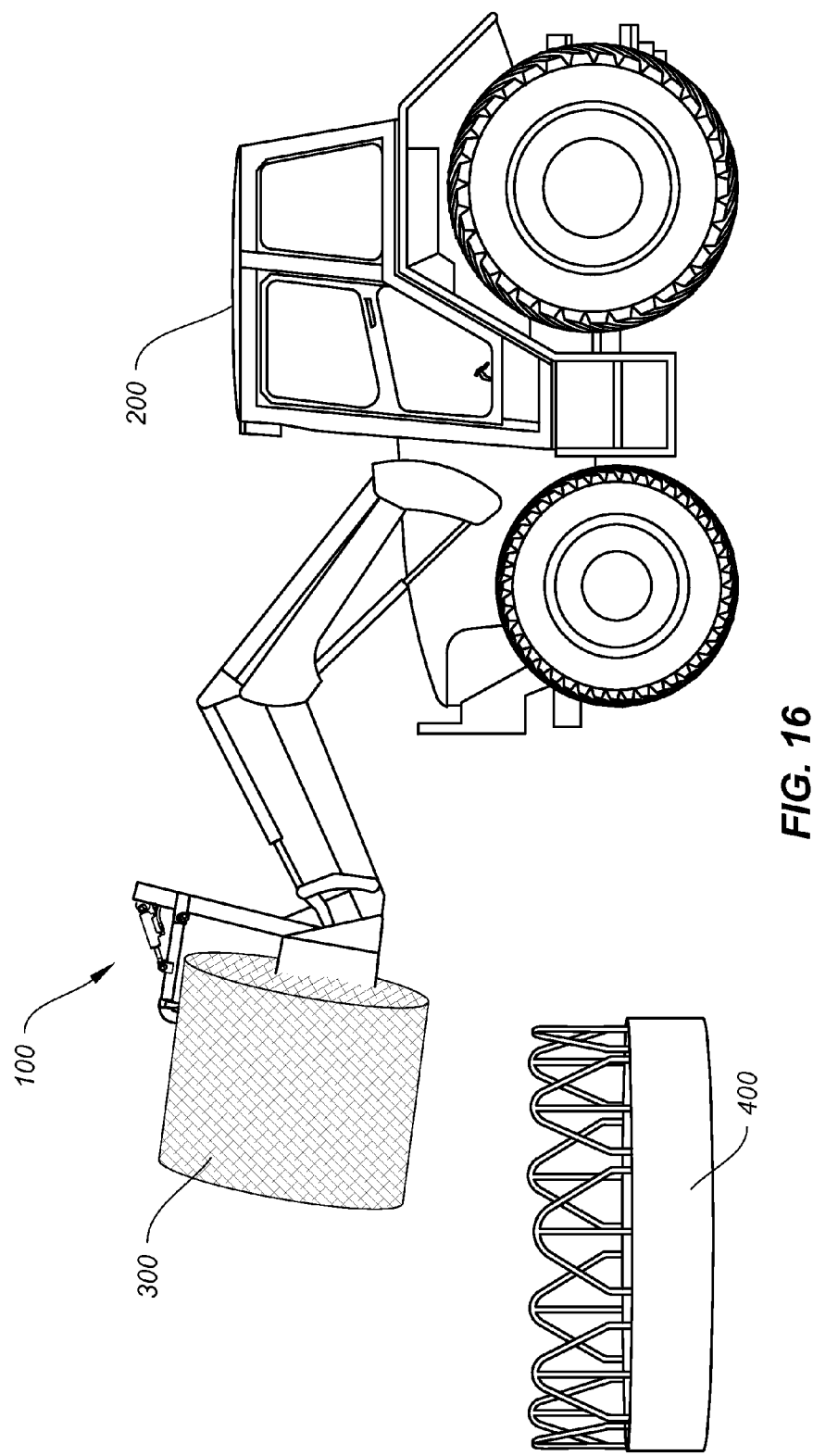
FIG. 16 illustrates approaching a feed ring with initial positioning of the hay bale engaged by the bale spear with grabber accessory.
Figure 17:
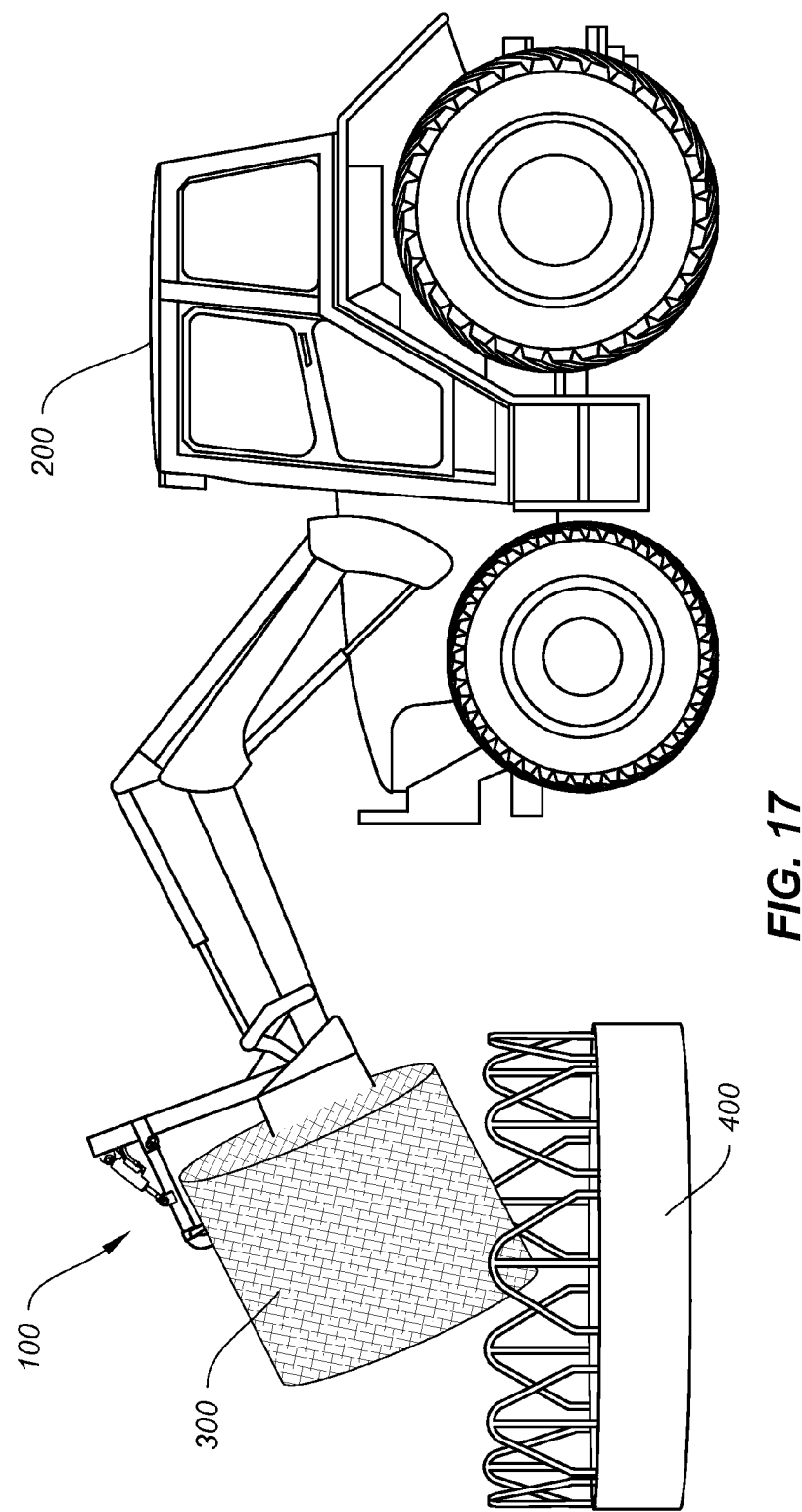
FIG. 17 illustrates centering and final positioning of the hay bale within the feed ring.
Figure 18:
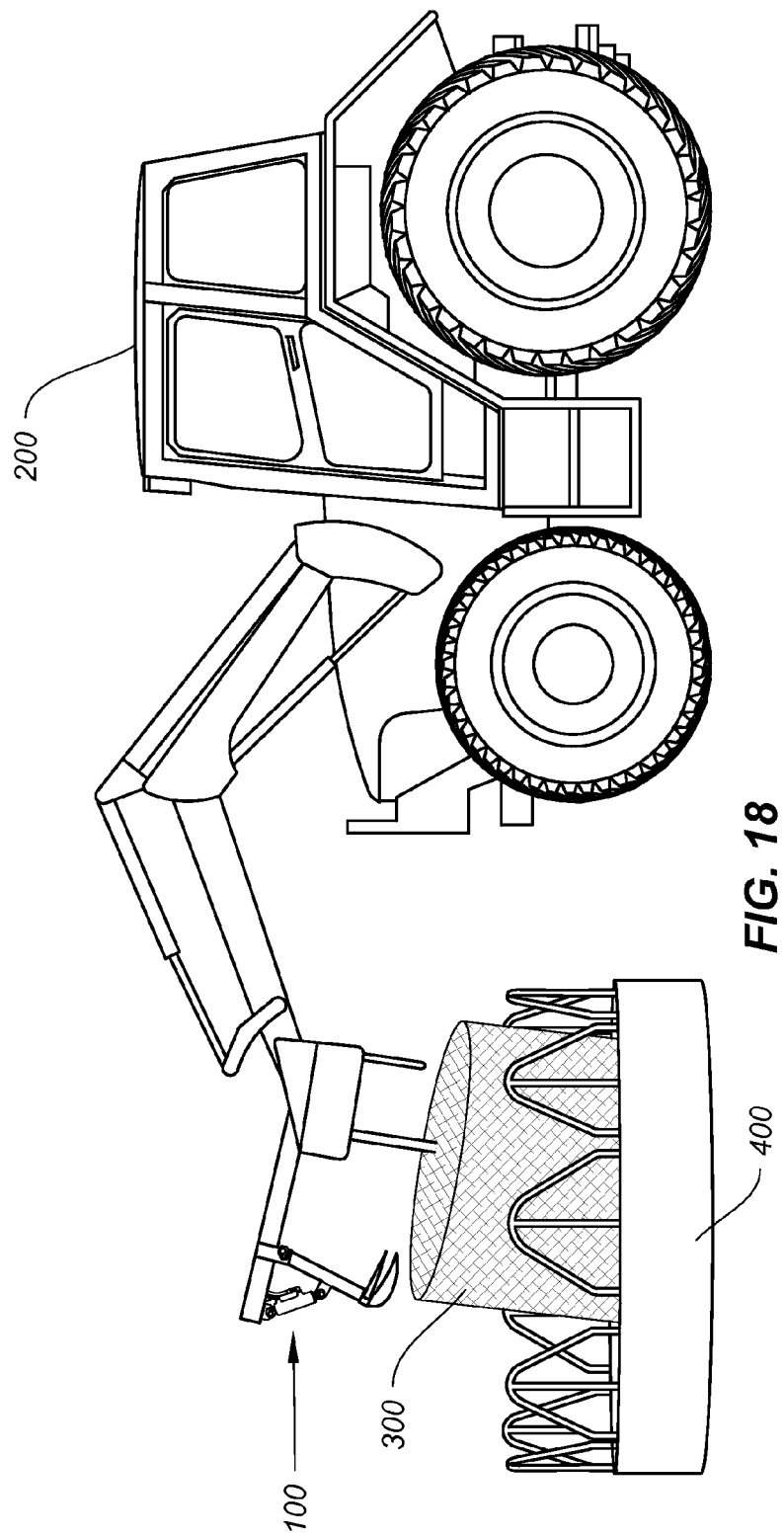
FIG. 18 illustrates release of the hay bale engaged by the bale spear with grabber assembly within the feed ring.

As shown in FIGS. 16-18, with the grabber accessory 100 engaged, positioning of the hay bale 300 over the feed ring 400 is secure; the bale 300 will not slip off the main spear and damage the side of the feed ring 400. The operator can then engage the hydraulics to actuate the hydraulic cylinder 110 so as to release the arm 102 from the bale 300 directly in the center of the feed ring 400, as shown in FIG. 18.

Figure 19:
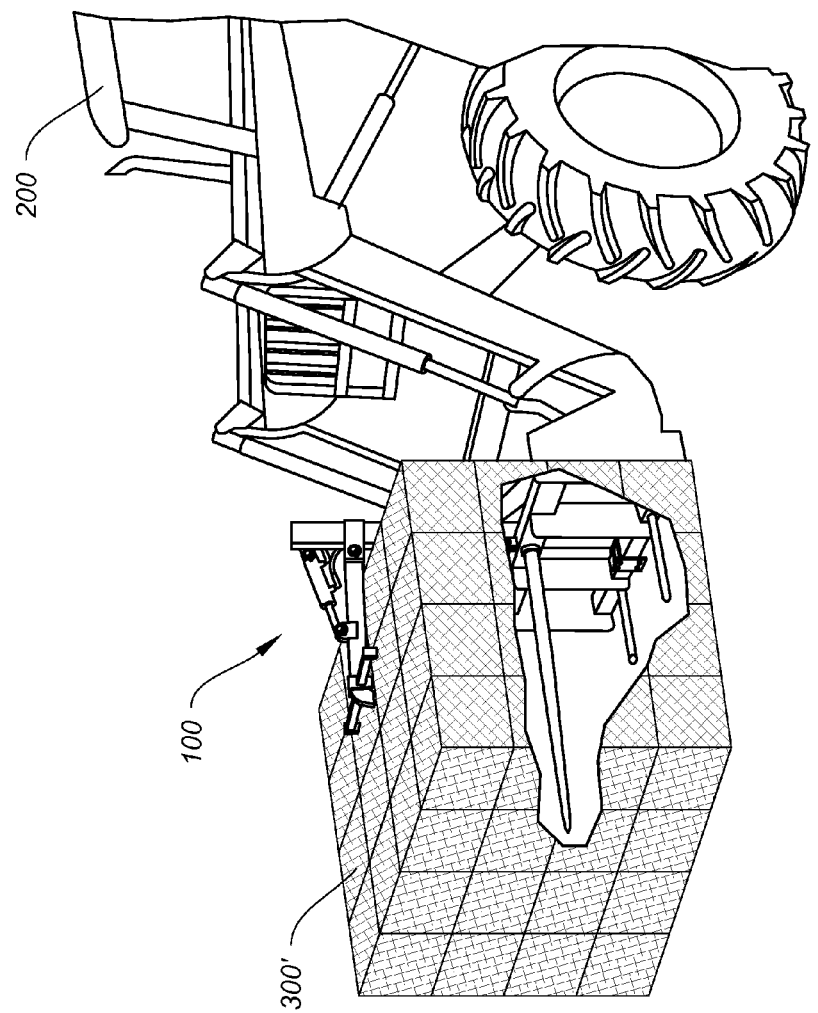
FIG. 19 illustrates a tractor with bale spear implement configured with the bale grabber according to the example embodiment, engaged with a 4×4×4 square hay bale bundle.

FIG. 19 illustrates a tractor with bale spear implement configured with the bale grabber according to the example embodiment, engaged with a 4×4×4 square hay bale bundle. In FIG. 19, part of the square hay bale 4×4×4 cube 300' interior is shown so as to see the general penetration of the grabber assembly 100 as installed on a main spear. The grabber accessory 100 shown and described may enhance safety in round or square hay bale transport. The bale is secure and does not slip off the main spear, otherwise potentially harming a human or accidently injuring a farm animal in the barn and/or field. Should tractor hydraulics fail and the main spear implement drop down, the bale would not slip off as it still would be retained by the grabber accessory 100.

Accordingly, it is envisioned that use of the grabber accessory 100 with an existing bale spear implement on a prime mover such as a tractor would greatly reduce damage to hay bale holders and feeders, pickup trucks and/or trailers during placement of the bales within them. Use of the grabber accessory 100 also may substantially reduce the time spent repositioning the hay bales or time spent adjusting feeders as the bale is loaded into the feeder, for example.

The example embodiments being thus described, it will be obvious that the same may be varied in many ways. The example grabber accessory is not limited to incorporation or use with an existing bail spear implement or accessory of a prime mover such as a tractor. The grabber accessory 100 can be configured for attachment to another prime mover such as a bobcat or back hoe, or to another implement for various applications. In one example, grabber accessory 100 may be configured for installation on a front end loader bucket as a grapple for picking up loose materials and brush, securing these materials during transport. In another example the grabber accessory 100 may be installed on pallet forks to control and secure a load as the load is moved for drop off at another location. In a further example the grabber accessory 100 can be mounted to a skid steer loaded for the above-noted uses of securing a load during transport, or directly installed on a compact tractor with appropriate hydraulic hook-ups or to a farm tractor up to 150 hp, for example, for use in securing a load or as a grapple to accumulate brush and debris. Such variations are not to be regarded as departure from the example embodiments, and all such modifications as would be obvious to one skilled in the art are intended to be included in the following claims.

I claim:

1. A grabber accessory configurable for attachment to a bale spear implement, comprising:
   a single, vertically-oriented stanchion,
   a pivotable arm having a proximate end attached to the stanchion to form a pivot point of the arm and a distal end extending generally transverse to the stanchion and terminating in a downward central claw,
   a pair of downward extending tines, each tine mounted to the distal end of the arm in opposed spaced relation to the claw on either side thereof, wherein each tine is mounted to a horizontal connector rod, each connector rod is attached to a plate, and the plates sandwich the distal arm end and are secured together by fasteners so that the opposed tines are offset from the central claw,
   a hydraulic cylinder attached between an upper end of the stanchion and a surface of the arm between the proximate and distal ends, the hydraulic cylinder configured to raise and lower the arm under hydraulic control from a main hydraulic feed of a prime mover to which the bale spear implement is attached,
   a hollow tubular sleeve securing a lower portion of the stanchion therein, and
   a pair of vertically spaced clamping assemblies coupling the sleeve to cross member surfaces of the bale spear implement so as to secure the grabber accessory in an upright position adjacent a main spear of the bale spear implement extending outward therefrom in perpendicular relation to the stanchion.

2. The accessory of claim 1, wherein
   the lower portion of the stanchion includes a bore therethrough,
   the sleeve includes a pair of adjustment bores formed therethrough in vertical spaced relation and adapted to align with the bore of the stanchion to adjust the height of the grabber accessory, and
   a retaining pin is adapted to be inserted through the aligned bores to lock the stanchion in place at a desired height.

3. The accessory of claim 1, wherein the pair of clamping assemblies include:
   an upper plate adapted to bear against a first cross member surface of the bale spear implement, the upper plate including a hole in each corner thereof,
   a first pair of U-bolts which contact an upper part of the sleeve, each U-bolt having threaded ends which extend through corner pairs of holes and are secured by fasteners so as to torque the first cross member surface of the bale spear implement between the sleeve and upper plate,
   a lower plate adapted to bear against a second cross member surface of the bale spear implement, the lower plate including a hole in each corner thereof, and
   a second pair of U-bolts which contact a lower part of the sleeve, each U-bolt having threaded ends which extend through corner pairs of holes and are secured by fasteners so as to torque the second cross member surface of the bale spear implement between the sleeve and lower plate.

4. The accessory of claim 1, wherein
   the stanchion upper end to hydraulic cylinder attachment serves as a first pivot point for the hydraulic cylinder,
   the hydraulic cylinder includes an internal piston and a reciprocating rod, the piston connected to a proximal end of a reciprocating rod, a distal end of the reciprocating rod connected to the arm at a junction between arm proximate and distal ends which serves as a second pivot point.

5. The accessory of claim 1, wherein distal ends of the claw and tines are adapted to penetrate one of a round bale and a square hay bale.

6. The accessory of claim 1, wherein the prime mover to which the bale spear implement is attached and which provides the main hydraulic feed is a farm tractor.

7. A grabber accessory configurable for attachment to a bale spear implement, comprising:
   a single, vertically-oriented stanchion,
   a pivotable arm having a proximal end connected pivotally connected to the stanchion and a distal end of the arm terminating in a downward central claw and a pair of downward extending tines in opposed spaced relation to the claw on either side of the central claw, wherein each opposed tine is mounted to a horizontal connector rod, and each connector rod is attached to a plate, the plates sandwiching the distal arm end and secured together by fasteners so that the opposed tines are offset from the central claw,
   a hydraulic cylinder to raise and lower the arm under hydraulic control from a main hydraulic feed of a tractor to which the bale spear implement is attached, and
   a pair of vertically spaced clamping assemblies coupling the stanchion to the bale spear implement in an upright position.

8. The accessory of claim 7, wherein
   the stanchion upper end to hydraulic cylinder attachment serves as a first pivot point for the hydraulic cylinder, and
   the hydraulic cylinder includes an internal piston and a reciprocating rod, the piston connected to a proximal end of a reciprocating rod, a distal end of the reciprocating rod connected to the arm at a junction between arm proximate and distal ends serving as a second pivot point.

9. The accessory of claim 7, further comprising:
   a hollow tubular sleeve securing a lower portion of the stanchion therein.

10. The accessory of claim 9, wherein the stanchion is height adjustable within the sleeve.

11. The accessory of claim 9, wherein
    a lower part of the stanchion includes a bore therethrough,
    the sleeve includes a pair of vertically spaced adjustment bores formed therein and adapted to align with the bore of the stanchion to adjust the height of the grabber accessory, and
    a retaining pin is adapted to be inserted through the aligned bores to lock the stanchion in place at a desired height.

12. The accessory of claim 9, wherein the pair of clamping assemblies include:
    an upper plate adapted to bear against a first frame portion of the bale spear implement, the upper plate including a hole in each corner thereof, a first pair of U-bolts which contact an upper part of the sleeve, each U-bolt secured by fasteners via the corner holes so as to torque the first frame portion between the sleeve and upper plate, a lower plate adapted to bear against a second frame portion of the bale spear implement, the lower plate including a hole in each corner thereof, a second pair of U-bolts which contact a lower part of the sleeve, each U-bolt secured by fasteners via the corner holes so as to torque the second frame portion between the sleeve and lower plate.

13. A grabber accessory configurable for attachment to a prime mover, comprising:

a stanchion, a pivotable arm attached to the stanchion and having a distal end terminating in a downward central claw and a pair of downward extending tines in opposed spaced relation to the claw on either side of the central claw, wherein each opposed tine is mounted to a horizontal connector rod, and each connector rod is attached to a plate, the plates sandwiching the distal arm end and secured together by fasteners so that the opposed tines are offset from the central claw, a hydraulic cylinder configured to raise and lower the arm under hydraulic control from a main hydraulic feed of the prime mover, and a pair of clamping assemblies attaching the stanchion to the prime mover so as to secure the grabber accessory in an upright position.

14. The accessory of claim 13, further comprising:

a hollow tubular sleeve securing a lower portion of the stanchion therein, wherein the stanchion is height adjustable within the sleeve.

15. The accessory of claim 14, wherein the lower portion of the stanchion includes a bore therethrough, the sleeve includes a pair of vertically spaced adjustment bores formed therein and adapted to align with the bore of the stanchion to adjust the height of the grabber accessory, and a retaining pin is adapted to be inserted through the aligned bores to lock the stanchion in place at a desired height.

16. The accessory of claim 13, wherein the claw and tines are adapted to penetrate one of a hay bale, accumulate brush, and accumulate debris.

17. The accessory of claim 13, wherein the prime mover is one of a tractor, back hoe, and bobcat.

* * * * *